United States Patent

Vincken

[11] Patent Number: 5,809,565
[45] Date of Patent: Sep. 15, 1998

[54] METHOD OF AND DEVICE FOR WRITING AND READING DATA ITEMS IN A MEMORY SYSTEM INCLUDING A DATA ITEM MEMORY AND A LENGTH MEMORY

[75] Inventor: Koenraad L. Vincken, Amsterdam, Netherlands

[73] Assignee: U.S. Philips Corporation, New York, N.Y.

[21] Appl. No.: 574,797

[22] Filed: Dec. 19, 1995

[30] Foreign Application Priority Data

Dec. 20, 1994 [EP] European Pat. Off. .............. 94203690

[51] Int. Cl.$^6$ .............................. G06F 12/04; H03M 7/40; G06K 9/36
[52] U.S. Cl. .............................. 711/212; 341/59; 341/63; 341/67; 345/515; 348/395; 375/246; 375/253; 382/245; 382/246
[58] Field of Search .............................. 395/410, 421.1, 395/405, 380; 345/515; 711/100, 200, 212; 341/59, 63, 67; 375/246, 253; 382/245, 246; 348/395

[56] References Cited

U.S. PATENT DOCUMENTS

| | | | |
|---|---|---|---|
| 4,502,115 | 2/1985 | Eguchi ..................................... | 395/307 |
| 4,523,276 | 6/1985 | Maejima et al. ......................... | 711/100 |
| 4,958,302 | 9/1990 | Fredrickson et al. .................... | 345/515 |
| 5,214,764 | 5/1993 | Komuro et al. ......................... | 711/117 |
| 5,283,840 | 2/1994 | Kitamura et al. ....................... | 382/282 |
| 5,357,620 | 10/1994 | Suzuki .................................... | 711/220 |
| 5,371,856 | 12/1994 | Yoshino et al. ......................... | 395/250 |
| 5,489,746 | 2/1996 | Suzuki et al. ............................. | 84/602 |
| 5,577,219 | 11/1996 | Timko et al. ............................ | 711/201 |
| 5,602,548 | 2/1997 | Chun et al. .............................. | 341/6.7 |
| 5,619,715 | 4/1997 | Dinkjian et al. ........................ | 395/898 |

*Primary Examiner*—Eddie P. Chan
*Assistant Examiner*—Hong C. Kim
*Attorney, Agent, or Firm*—Jack D. Slobod

[57] ABSTRACT

Data items associated with different locations in a spatial field of locations are written in a memory. The memory comprises a length memory in which for each location there is stored a length code which indicates the memory length required for the data item. For the reading of a data item associated with a location, the address of the data item is calculated by reading the length codes for the data items of preceding locations from the memory and by summing the lengths indicated.

16 Claims, 3 Drawing Sheets

METHOD OF AND DEVICE FOR WRITING AND READING DATA ITEMS IN A MEMORY SYSTEM INCLUDING A DATA ITEM MEMORY AND A LENGTH MEMORY

BACKGROUND OF THE INVENTION

The invention relates to a method of writing and reading data items in a memory system, each data item having an associated set of coordinates in a space. The invention also relates to a method of writing into and to a method of reading such data items from the memory system.

1. Field of The Invention

The invention also relates to a device which comprises a memory system suitable for writing and reading such data items. The invention furthermore relates to memory systems comprising write means and read means for a device suitable for reading such data items.

2. Description of The Related Art

For example, in image processing techniques it is often necessary to store data items associated with locations denoted by a set of coordinates (x,y). The data items may be, for example digitized light intensities in a camera image, or color vectors or vectors representing a pattern recognized at the area of the relevant coordinates (x,y), or supplementary data associated with the relevant location.

Conventionally a data item memory which can be addressed by the associated set of coordinates of the data item is used for this purpose. Upon storage the data item is stored in the memory location having the associated set of coordinates of the data item as its address. Upon reading this location is addressed by the associated set of coordinates.

Such a data item memory requires a large storage space, notably as each data item comprises a larger number of bits and as the dimension of the space is greater. For example, in medical "image" processing where data items originate, for example from an X-ray scanner supplying three-dimensional tomographic images, the memory space required will be substantially greater than when two-dimensional images are involved.

Summary of The Invention

It is inter alia an object of the invention to provide methods for writing and storage and devices for this purpose which require less storage space, without excessively increasing the mean time required for storing and/or reading the data items.

The invention provides a method of writing data items into a memory and of reading a searched data item from the memory system, each data item having an associated set of coordinates in a space, which method utilizes a data item memory and a length memory which can be addressed by the associated set of coordinates, for writing said method comprising the following steps for each of a series of sets of associated coordinates:

receiving an associated data item, determining, from the associated data item, a respective length code which indicates a data length required for storage of the data item in the data item memory, and writing the respective length code in the length memory, addressed by the relevant associated set of coordinates, writing, unless the respective length code indicates a length zero, the associated data item in the data item memory at a respective address which corresponds to a cumulation of the length codes of all associated sets of coordinates preceding the relevant associated set of coordinates in the series, and for reading said method comprising the following steps for a presented set of coordinates with which the searched data item is associated:

reading an addressed length code from the length memory, addressed by the presented set of coordinates and, if the length indicated by the addressed length code is greater than zero:

reading the length codes of the associated sets of coordinates preceding the relevant associated set of coordinates in the series, and determining a sum of the lengths indicated thereby, reading the searched data item indexed with this sum from the data item memory.

The invention also provides a device comprising a memory system which is arranged to store data items, each data item having an associated set of coordinates in a space, and also comprising write means and read means which are coupled to the memory system, the write means comprising an input for receiving a data item associated with a relevant set of coordinates, length determining means which are arranged to determine from the data item a length code which indicates a data length required for storage of the data item in the data item memory, a length memory, length write means for writing the length code in the length memory, writing in the length memory taking place at an address corresponding to the relevant set of coordinates, data item write means for writing the data item in the data item memory at an own address which corresponds to a cumulation of the length codes of all associated sets of coordinates preceding the relevant associated set of coordinates in a predetermined series of sets of coordinates, and in which the read means comprise an input for receiving a presented set of coordinates with which a searched data item is associated, length read means for reading a searched length code from the length memory, addressed by the presented set of coordinates, data item read means for reading the searched data item from the data item memory, comprising sum determining means for determining a sum of lengths indicated by length codes of the associated sets of coordinates preceding the presented set of coordinates in the series, indexing means arranged to read the searched data item indexed with the sum from the data item memory.

The invention is based on the recognition of the fact that in many applications data items which do not contain information or have a standard value which need not be stored are associated with the majority of the sets of coordinates. If the data item is to be stored, a predetermined length of data item memory or one of a limited number of feasible lengths is required. The length code then requires only one bit or a small number of bits. As a result, the length memory may be comparatively small. The data item memory may also be comparatively small, because only a small number of data items need be stored, i.e. only the data items which contain information or do not have the standard value.

Upon reading it will usually be necessary to read only the length memory. This can be performed very rapidly, because the set of coordinates directly addresses the desired length code. Notably it will not require more time than the searching of a data item in a memory in which the data items are stored so as to be addressable by way of the coordinates. Consultation of the data item memory will require more time, because it will usually be necessary to find out which data item stored is associated with the presented set of coordinates. However, this will only be necessary in exceptional cases, so that the mean time required for reading will increase only slightly.

The method, however, may already be advantageous in terms of limiting the memory occupation when data items for which no space is required in the data item memory are associated with only a small percentage (for example, 2%) of the sets of coordinates.

A version of the method in accordance with the invention comprises the following steps for writing:

determining for each set of coordinates the category whereto this set belongs within a predetermined classification of the sets of coordinates which subdivides the space into categories of sets of coordinates, the sets of coordinates in each category constituting a respective concatenation in said series, storing for each category in a reference memory a respective reference to a respective sub-set of the data items stored in the data item memory and associated with sets of coordinates in the relevant category, which method comprises the following steps for reading determining the category whereto the presented set of coordinates belongs, said sum being limited to the length codes of the associated sets of coordinates within the relevant category, reading a reference from the reference memory, addressed by an indication of the category, and reading the data item searched, indexed with a combination of the sum and the reference, from the data item memory.

Because it suffices to count as from the set of associated coordinates upon reading, counting can be performed more quickly. The reference memory need contain only one memory location per category so that it can remain comparatively small. A classification method which can be simply implemented consists in taking a part of each set of coordinates and assigning the sets of coordinates for which this part is the same to one and the same category. For example, for sets of (x,y,z) coordinates, all sets having the same (y,z) can be assigned to one category. In one embodiment the common part concerns all coordinates but one. Counting then requires only a minimum period of time, but the reference memory will be rather large. In another embodiment the common part concerns only one of the coordinates; the reference memory is then comparatively small, but counting requires more time. If the data items are received in the order of coordinates, moreover, the common part preferably concerns the part of the coordinates which changes least rapidly upon reception.

There is a version of the method of the invention for reading data items in which the length memory is accessible in blocks, each of which contains two or more length codes which are addressed by sets of coordinates which directly succeed one another in said series, and in which the determination of the sum involves determination of a sub-sum of two or more lengths on the basis of reading one block. Thus, the number of times that data must be read from the length memory upon summing is smaller than the number of length codes to be read for the summing operation. As a result, the reading of the length codes requires only a comparatively small amount of time, so that summing is accelerated.

The method of writing and reading is preferably executed in combined form. The methods are advantageous notably for the processing of data items associated with sets of coordinates in three-dimensional or more-dimensional spaces as occurring frequently in, for example medical image processing involving X-ray scanners, magnetic resonance imaging scanners, etc.

The invention also relates to devices arranged to execute the method.

These and other aspects of the invention will be apparent from and elucidated with reference to the embodiments described hereinafter.

DETAILED DESCRIPTION OF THE PREFERRED EMBODIMENTS

Figure 1:
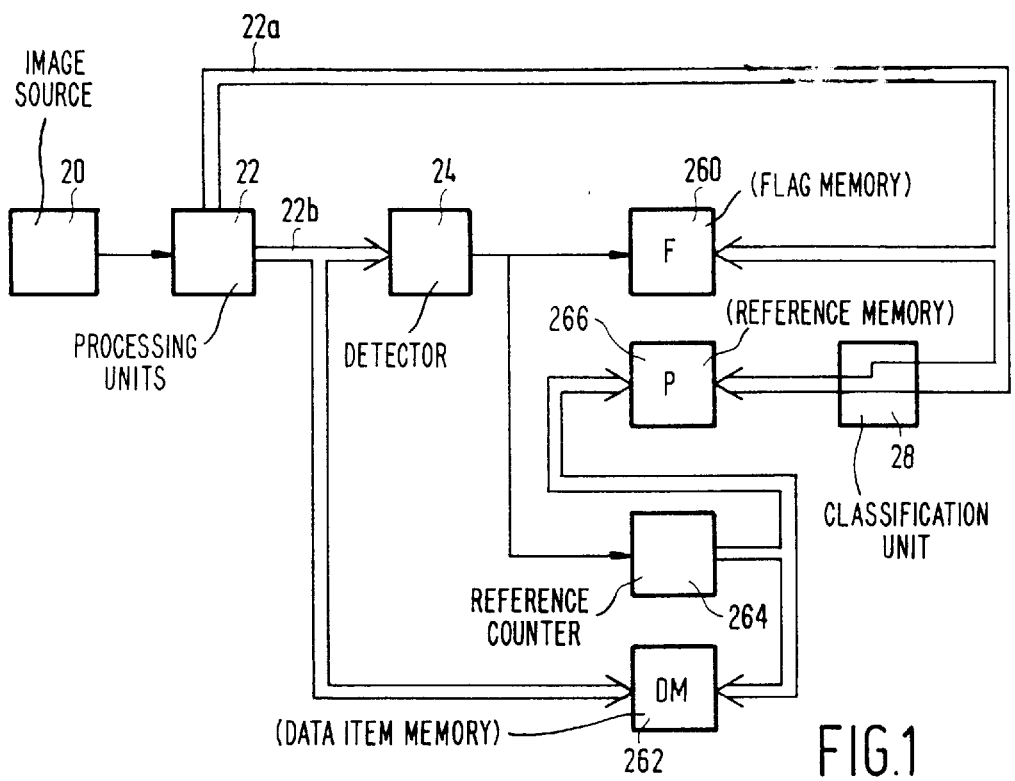
FIG 1 shows an embodiment of a device in accordance with the invention.

FIG. 1 shows an embodiment of a device for writing data items in accordance with the invention. The device comprises an image source 20, for example an X-ray scanner, which is coupled to an input of a processing unit 22. The processing unit 22 comprises a coordinate output 22a and a data item output 22b. The data item output 22b is coupled to a data input of a data item memory DM 262 and to a detector 24. An output of the detector 24 is coupled to a length memory F 260, to be referred to as the flag memory F 260, and to a reference counter 264. The reference counter 264 has a reference output coupled to an address input of the data item memory DM 262 and to a data input of a reference memory P 266. The coordinate output 22a of the processing unit 22 is coupled to an address input of the flag memory F 260 and, via a classification unit 28, to an address input of the reference memory P 266.

Prior to the description of the operation of the device shown in FIG. 1, the method will be described in more general terms with reference to FIG. 2a.

Figure 2A:
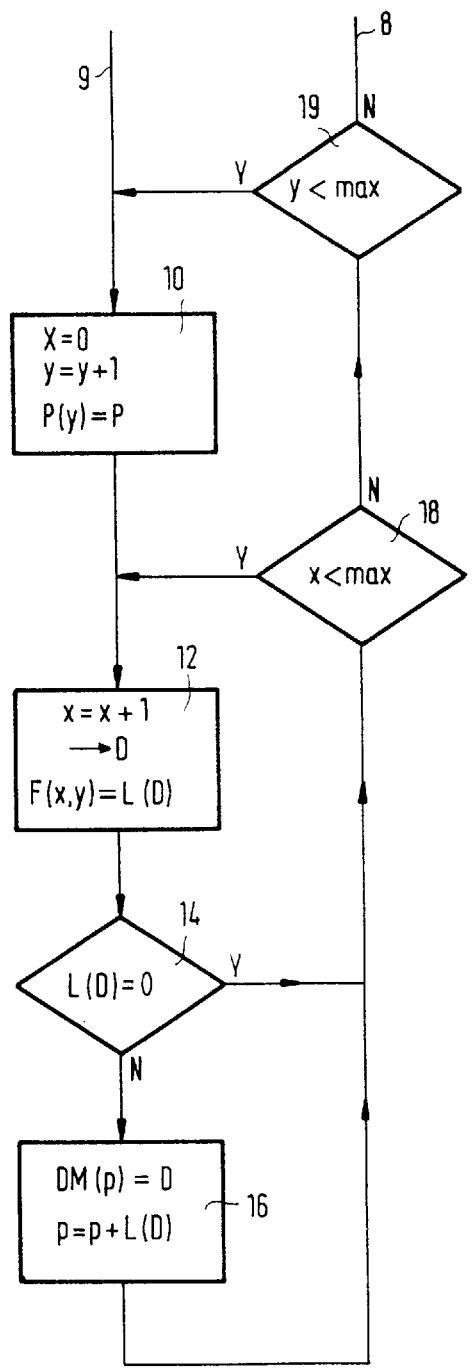
FIG. 2a shows a flow chart of a version of the method of the invention for writing data items.

FIG. 2a shows a flow chart of a version of the method of the invention for writing data items in a memory system. The flow chart utilizes the reference memory P 266 for the storage of references, the flag memory F 260 for the storage of flags, and the data memory DM 262 for the storage of data items. By way of example, the flow chart utilizes sets of coordinates (x,y) and data items D written, it being assumed that the data items arrive in the order of ascending coordinate values, the x coordinate ascending most rapidly. The coordinates (x,y) increase from 1 to xmax and ymax, respectively.

The flow chart has an entrance point 9 where a first one of the coordinates y has an initial value 0 and a reference "p" has an initial value (for example, 1). The entrance point 9 leads to a step 10. Therein, the value of the first coordinate y is incremented, another coordinate x is initialized to 0, and the reference "p" is written into the reference memory P 266 in a location P(y) which is addressed by the first coordinate y.

The next step in the flow chart is the step 12. Therein, the second coordinate x is incremented and a data item D associated with the set of coordinates (x,y) is written. Subsequently, the length L(D) of the memory space required for storing the data item D in the data item memory is determined. Depending on the data item, this length may be, for example zero or 40 bytes.

In the case of pattern recognition, the length zero is used, for example if no pattern has been recognized with the set of coordinates; if a pattern has been recognized with the set of coordinates, 40 bytes of information such as intensity values, derivatives of intensity values, etc. are used. When the length can assume a limited number of values only, L(D) preferably constitutes a length code which is not a direct binary representation of a number but only a selection between feasible lengths (in the above example where the length was 0 or 40 bytes, a length code of 1 bit suffices, a bit value 0 then representing, for example the length 0 and the bit value 1 the length 40).

The length code L(D) is written in the flag memory F 260 in a location F(x,y) which is addressed by the coordinates (x,y).

The next step 14 provides conditional execution of the subsequent step 16. If the length code L(D) indicates that more than a length zero is available for the data item D, the data item D is written into the data item memory DM 262 in a location which is indicated by the reference p. If desired, only a relevant part of the data item D is written, or the data item D is supplemented by supplementary information during writing.

The reference p is subsequently incremented by the length used for the data item. If all data items D written have the same length, the addresses in the data item memory DM 262 are preferably expressed in units of this length; therefore, in that case the reference p is incremented by 1.

Subsequently, it is tested (step 18) whether the x coordinate has reached its maximum value. If this is not the case, the method is repeated as from the step 12 in which the x coordinate is incremented and the data item D is written. If the x coordinate has reached its maximum value, it is tested (in step 19) whether the y coordinate has reached its maximum value. If this is not the case, the method is repeated as from the first step 10.

If the test 19 reveals that the y coordinate has reached its maximum value, the execution of the method has been completed. The flag memory F 260 is then filled with length code, each of which is stored at a respective memory location addressed by a set of coordinates (x,y). The length code stored in the relevant location then indicates the length of the memory space used for the data item associated with the relevant location (x,y). The data item memory DM 262 then stores the data items for which more than a length zero is available, in a predetermined order of coordinates, i.e. in the order of ascending y coordinates and, in the case of corresponding y coordinates, in the order of ascending x coordinates. The reference memory P 266 stores references to locations in the data item DM 262, each reference being associated with a respective y coordinate and constituting a reference to the first location in the data item memory DM 262 in which data item D having this y coordinate are stored, if any.

Figure 2B:
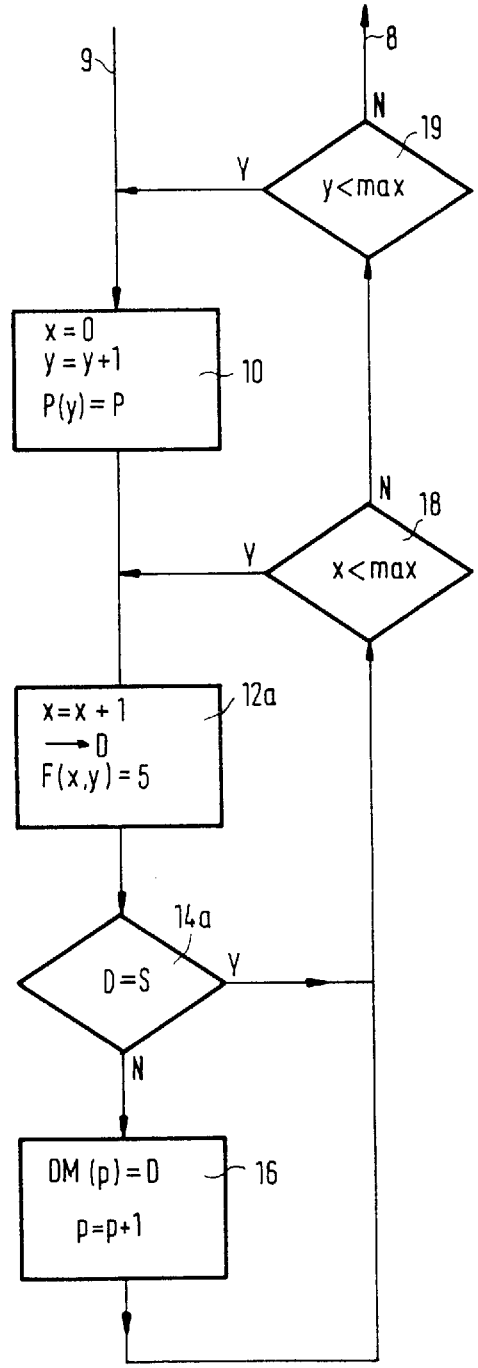
FIG. 2b shows a further flow chart of a version of the method of the invention for writing data items.

FIG. 2b shows a further flow chart of a further example of the method of the invention for writing data items in a memory system. The flow chart is the same as that shown in FIG. 2a, except for the steps 12, 14 of FIG. 2a. In FIG. 2b these steps are replaced by the steps 12a, 14a.

The difference consists in that in the flow chart of FIG. 2a the value of the data item D decides whether or not the data item D is written in the data item memory DM 262. If the data item D has a standard value S, it is not written.

In step 12a a flag which indicates whether the data item D has a standard value S is written in the flag memory F 260 in a location F(x,y) addressed by the coordinates (x,y).

Step 14a provides conditional execution of the subsequent step 16. If the data item D does not have the standard value S, the data item D is written in the data item memory DM 262 in a location indicated by the reference p. The reference p is subsequently incremented.

The foregoing is based on binary flags which indicate exclusively whether or not the data item has the standard value S. Instead, however, flags can be used which are capable of assuming more than two different values. The flag then indicates the relevant value of the data item from among a plurality of standard values, or that the data item is stored in the data item memory DM 262. For example, a 2-bit flag could indicate, for example by way of the value 0, that the data item is stored in the data item memory DM 262 and, by way of the values 1, 2 and 3, that the data item has a first, a second or a third standard value, respectively. The use of such a flag necessitates a larger capacity for the flag memory F 260, but results in gains in the data item memory DM 262. This is advantageous notably if the data items usually have one of a limited number of more than one standard values.

Basically only the data items which do not have the standard value are written into the data item memory DM 162; the flag then written into the flag memory F 260 indicates that the data item does not have the standard value. However, the flag serves notably to indicate the length used for the data item in the data item memory DM 262. It is, therefore, not objectionable when a data item of standard value is nevertheless written into the data item memory DM 262, provided that the associated flag in the flag memory F 260 indicates that this has taken place. For as long as the sets of coordinates for which this takes place is much smaller than the number of sets of coordinates for which the data item does not have the standard value, it will hardly have any adverse effects on the performance of the device.

During operation the effect of the device shown in FIG. 1 is equivalent to that of the flow chart of FIG. 2. The data items D and the sets of coordinates (x,y) are formed by the processing unit 22 which also provides the major part of the addressing. In addition to the data item, the processing unit can calculate a variety of supplementary information to be stored together with the data item in the relevant location in the data item memory DM 262; such information may contain, for example intensity values, spatial derivatives of the intensity values, other features such as, for example locally weighted moments, identifications of locally recognized patterns, etc.

The classification unit 28 operates simply by passing on only the y coordinate. The test 14 is performed by the detector 24; the conditional incrementation of the reference p is executed by the reference counter 264 which applies the reference p to the data item memory DM 262 and the reference memory P 266. The various parts of FIG. 1 are synchronized by a clock (not shown).

Figure 3:
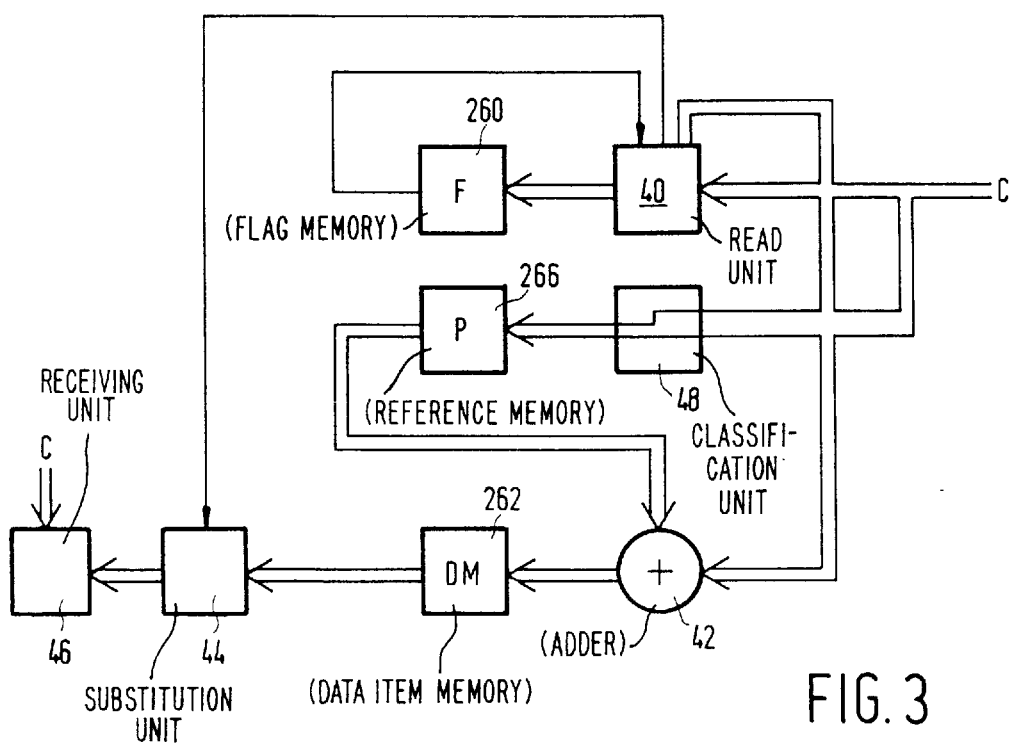
FIG. 3 shows an embodiment of a device in accordance with the invention.

FIG. 3 shows an embodiment of a device for reading data items in accordance with the invention. The device again comprises the flag memory F 260, the reference memory P 266 and the data item memory DM 262. The device comprises an input C for coordinates. The input C is coupled to a read unit 40, to a classification unit 48 and to a receiving unit 46 (for example, a display device). An output of the read unit 40 is coupled to the address input of the flag memory F 260. The data output of the flag memory F 260 is coupled to the read unit 40. The read unit 40 comprises a further output which is coupled to a control input of a substitution unit 44. The read unit 40 also comprises an output which is coupled to a first input of an adder 42. The classification unit 48 is coupled to an address input of the reference memory P 266. The data output of the reference memory P 266 is coupled to a second input of the adder 42. The output of the adder 42 is coupled to the address input of the data item memory DM 262. The data output of the data item memory DM 262 is coupled to the substitution unit 44. An output of the substitution unit 44 is coupled to the receiving unit.

Prior to the description of the operation of the device shown in FIG. 3, the method will be described in more general terms with reference to FIG. 4.

Figure 4:
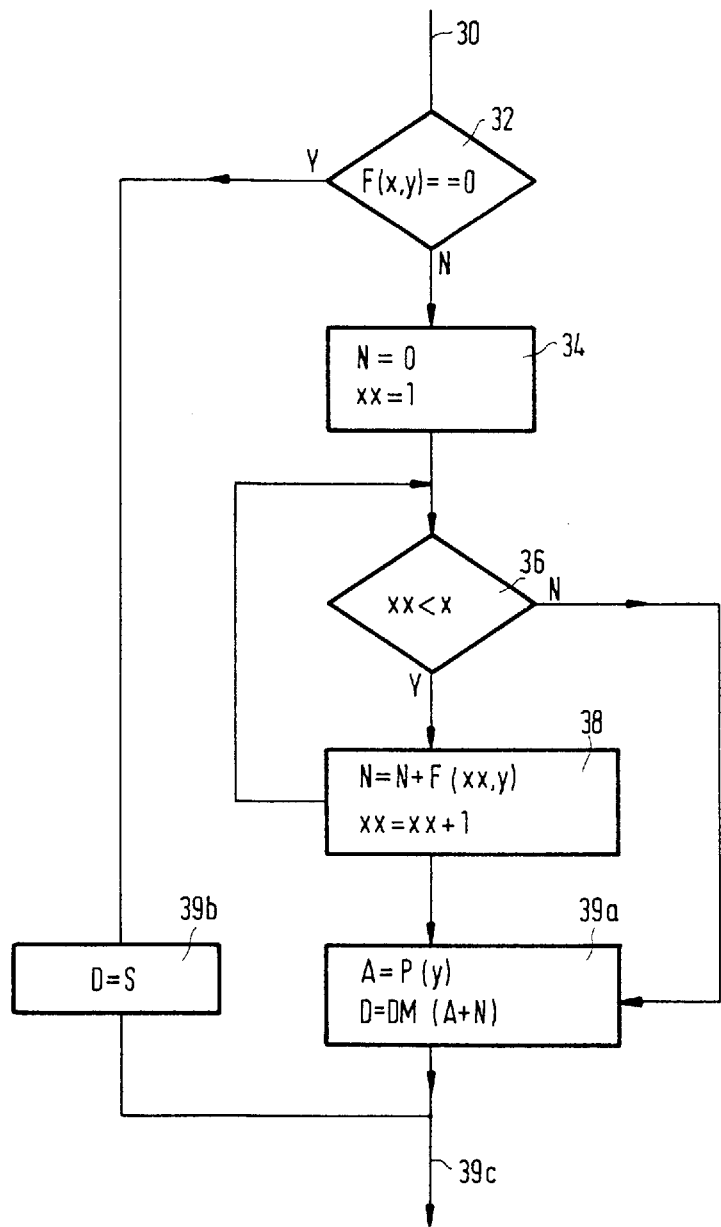
FIG. 4 shows a flow chart of a version of the method of the invention for reading data items.

FIG. 4 shows a flow chart of a version of the method of the invention for reading data items from a memory system. It is assumed that the flag memory F 260, the data item memory DM 262 and the reference memory P 266 have a contents as can be obtained by means of the method described with reference to the FIGS. 2a or 2b. Furthermore, by way of example it is assumed that at the entrance point 30 of the flow chart a received two-dimensional set of coordinates (x,y) is available and that the flags in the flag memory F 260 can assume the values 0 and 1, that a flag having the value 0 at an address addressed by the set of coordinates (x,y) indicates that the data item associated with this set of coordinates is not stored in the memory, and that a flag having the value 1 indicates that the data item is stored in the memory in one memory unit of predetermined length.

During a first step 32 of the flow chart it is tested whether the contents of the flag memory F 260 in the location F(x,y) addressed by the set of coordinates (x,y) received are zero. If so, the method continues with step 39b in which the data item D is set to a standard value S, after which the flow chart reaches its end point 39c, and the data item D becomes available.

If the value of the flag F(x,y) is not zero, implying that the data item associated with the set of coordinates (x,y) is stored in the data item memory DM 262, a number of subsequent steps 34, 36, 38 is executed. During these steps it is counted how many sets of coordinates (xx,y) have the same y coordinate and a lower x coordinate xx as the set of coordinates (x,y) presented, while in the flag memory F 260 the flag F(xx,y), addressed by such a coordinate, indicates that the associated data item is stored in the data item memory DM 262.

Counting is performed as follows. During a first next step 34 a count N and a count coordinate xx are initialized. During a second subsequent step 36 it is tested whether the count coordinate xx has reached the value of the x coordinate of the set of coordinates (x,y). If this is not the case, during a subsequent step 36 the count N is incremented by the value of the flag associated with the set of coordinates (xx,y) in the flag memory F 260, i.e. the count N is incremented by one if the flag F(xx,y) indicates that the associated data item does not have the standard value; otherwise, the count N is not incremented. Subsequently, the count coordinate xx is incremented and the method is repeated as from the step 36 in which it is tested whether the count coordinate xx has reached the value of the x coordinate of the set of coordinates.

If this is the case, a next step 39a is executed. Therein, a reference A is read from the reference memory P 266, i.e. from a location P(y) addressed by the y coordinate of the set of coordinates presented. The data item D is subsequently read from the data item memory DM 262, i.e. from a location whose address (A+N) is the sum of the reference A read and the count N. The flow chart thus again reaches its end point 39c where the data item D becomes available.

The device shown in FIG. 3 has an effect during operation which is equivalent to that of the flow chart of FIG. 4. The read unit 40 executes the test 32 as regards the value of the flag and determines, if necessary, the count N. The read unit 40 applies the count N to the adder 42 in which the count N is added to the address A originating from the reference memory P 266. The read unit 40 controls the substitution unit 44 which applies the standard value S to the receiving unit 46 if the read unit 40 signals that the flag memory F 260 indicates that the standard value is associated with the coordinates (x,y); if this is not the case, the substitution unit 44 transmits the data item D read from the data item memory DM 262. The various parts of FIG. 3 are synchronized by way of a clock (not shown).

For the flag memory F 260 preferably a memory is used which can be read in simultaneous blocks, a block being, for example a sixteen-bit word. The flags are stored in the flag memory F 260 preferably in a sequence such that a plurality of flags associated with successive sets of coordinates are stored together in one and the same block for counting the number of flags. For counting (FIG. 4) the read unit 40 must read a number of blocks from the flag memory F 260 in order to read a number of flags of successive sets of coordinates, and each time it must count the number of flags within each block read. The number of blocks to be read is then substantially smaller than the number of flags to be counted. Counting can thus be faster than when the flags have to be individually read from the flag memory F 260.

The counting of the number of flags read within a block can be simply performed by means of a Look-Up Table (LUT). The contents of each block then serve as an address for a LUT memory; at a location addressed by a contents the LUT memory contains the number of flags in said contents (for example, address 0 number 0, address 1 number 1, address 2 number 1, address 3 number 2, etc.).

The embodiments of the FIGS. 1 to 4 serve merely to illustrate a simplified example of the invention. In practice a large number of alternatives are feasible. For example, instead of two-dimensional sets of coordinates (x,y) use can be made of more-dimensional sets, for example three-dimensional sets (x,y,z). These sets can be classified by omitting 1 or more coordinates; for example, all sets of coordinates having the same (y,z) value ("common factor") can be considered to belong to the same category, so that the (y,z) value serves as an address for the reference memory P 266, or only the "z" coordinate can be taken as the common factor of a category. In both cases the count 34, 36, 38 must be modified upon reading (FIG. 4) so that it runs via flags associated with sets of coordinates belonging to the same category as the set of coordinates (x,y,z) presented. In the case of a classification utilizing (y,z) as the common factor, for example flags can be counted for (xx,y,z) where xx=1 to x; for classification utilizing z as the common factor, counting takes place over (xx,yy,z), where yy=1 to y, and if yy=y xx=1 to x and if yy<y with all feasible xx values. It will be apparent that as fewer coordinates are the same per category within a classification, more counting work and less reference memory P 266 is required.

In an extreme case, when all sets of coordinates are considered to form part of the same category, a reference memory can even be completely dispensed with and the operations in this memory in the FIGS. 2a, 2b and 4 can be omitted, be it at the expense of more counting work (over all sets of coordinates (xx,yy,zz) if zz=1 to z; if zz<z, counting over all feasible xx and yy, and if zz=z, counting over the same range as when utilizing categories with the z coordinate as the common factor). Counting can also be dispensed with by storing, upon writing, in correspondence with each data item stored in the data item memory DM 262, the associated set of coordinates in a memory. Upon reading, if the flag F(x,y, . . . ) for the presented set of coordinates (x,y, . . . ), indicates that the associated data item does not have the standard value, the data item whereto the correct coordinates correspond can be searched in the data item memory DM 262.

Furthermore, the description of the FIGS. 1 to 4 assumes binary flags which indicate exclusively whether the data item has the standard value S. Instead, however, use can be made of flags capable of assuming more than two different values. The flag then indicates the standard value of the data item from among a plurality of standard values, or that the data item is stored in the data item memory DM 262. For example, by way of the value 0 a 2-bit flag could indicate that the data item is stored in the data item memory DM 262, and by way of the values 1, 2 and 3 that the data item has a first, a second or a third standard value, respectively. The use of such a flag necessitates a higher capacity for the flag memory F 260, but leads to gains in the data item memory DM 262. This is advantageous notably if the data items usually have one value from among a limited number of more than one standard values.

If the lengths of the respective data items written into the data item memory DM 262 can assume only a limited number of values (for example, 0, 40 or 80 bytes), it may also be advantageous to split the data item memory DM 262 into several data item memories, one data item memory being formed for each feasible length value (for example, one for data items of 40 bytes and one for data items of 80 bytes). Data items of the same length are then written into the same data item memory. For the reading of the data item, first the data item memory wherefrom reading must take place (for example, the 80 byte memory or the 40 byte memory) is then determined, on the basis of the length code and, using the length memory F 260, the number of data items preceding the searched data item in the relevant data item memory is counted. This offers the advantage that the lengths need not be explicitly summed since the sum of the lengths can be determined simply by counting.

Furthermore, the description of the FIGS. 1 to 4 is also based on categories of sets of coordinates where a part of the coordinates (for example, the y and z coordinates) is always the same within a category. Other classifications are also possible, for example categories in which all sets of coordinates have the same value of x+y. Generally speaking, the classification units 28, 48 will implement a classification function C(x,y, . . .) which adds the number of a respective category to each set of coordinates. However, the data items associated with sets of coordinates within a category, in as far as they are written into the data item memory DM 262, must then be written into the memory DM 262 in succession, i.e. without data items associated with sets of coordinates from other categories being written therebetween. The word "succession" is to be understood to mean herein "succession of writing in the data item memory DM 262" in a logic sense: it is not necessarily a physical, spatial succession (for example, each time a memory location could be skipped and the skipped locations could be used for later categories), but a reproducible logic succession.

In practice the succession will usually correspond to the recurrent incrementation or decrementation of one coordinate (for example, the x coordinate), followed by a reset when the maximum or the minimum value is reached; in response to the reset, a next coordinate (for example, the y coordinate) is then incremented or decremented, etc. The classification unit 28, 48 will classify the sets of coordinates by appointing predetermined coordinates in such a succession as boundaries between the categories and by considering the sets of coordinates between a pair of boundaries as belonging to one and the same category. Counting (step 34 of FIG. 4) then commences by counting coordinates in the succession as from the next-lower boundary.

For simplicity of the description of the Figures, use has been made of separate flag memories F 260, reference memories P 266 and data item memories DM 262. These memories may be of a different nature (separate memory chips, disc memories etc.) or may also correspond to different address ranges in one larger physical memory which is constructed, for example entirely as a semiconductor memory, a magnetic disc memory, etc.

I claim:

1. A method of writing data items in a memory system and of reading a searched data item from the memory system, each data item having an associated set of coordinates in a space, which method utilizes a data item memory and a length memory which can be addressed by the associated set of coordinates, and for writing comprises the following steps for each of a series of sets of associated coordinates:

receiving an associated data item, determining, from the associated data item, a respective length code which indicates a data length required for storage of the data item in the data item memory, and writing the respective length code in the length memory, addressed by the relevant associated set of coordinates, writing, unless the respective code length indicates a length zero, the associated data item in the data item memory at a respective address which corresponds to a cumulation of the length codes of all associated sets of coordinates preceding the relevant associated set of coordinates in the series, and for reading said method comprises the following steps for a presented set of coordinates with which the searched data item is associated:

reading an addressed length code from the length memory, addressed by the presented set of coordinates and, if the length indicated by the addressed length code is greater than zero:

reading the length codes of the associated sets of coordinates preceding the relevant associated set of coordinates in the series, and determining a sum of the lengths indicated thereby, and reading the searched data item indexed with this sum from the data item memory.

2. The method as claimed in claim 1, comprising the following steps for writing:

determining for each set of coordinates the category whereto this set belongs within a predetermined classification of the sets of coordinates which subdivides the space into categories of sets of coordinates, the sets of coordinates in each category constituting a respective concatenation in said series, storing for each category in a reference memory a respective reference to a respective sub-set of the data items stored in the data item memory and associated with sets of coordinates in the relevant category, which method comprises the following steps for reading:

determining the category whereto the presented set of coordinates belongs, said sum being limited to the length codes of the associated sets of coordinates within the relevant category, reading a reference from the reference memory, addressed by an indication of the category, and reading the data item searched from the data item memory, indexed with a combination of the sum and the reference.

3. The method as claimed in claim 2, in which all sets of coordinates within each category are identical for the predetermined classification.

4. The method as claimed in claim 2, in which the length memory is accessible in blocks, each of which contains two or more length codes which are addressed by sets of coordinates which directly succeed one another in said series, and in which the determination of the sum involves determination of a sub-sum of two or more lengths on the basis of reading one block.

5. The method as claimed in claim 4, in which all sets of coordinates within each category are identical for a predetermined part.

6. The method as claimed in claim 5, in which the space and the associated sets of coordinates are at least three-dimensional.

7. The method as claimed in claim 2, in which all sets of coordinates within each category are identical for a predetermined part.

8. The method as claimed in claim 1, which the length memory is accessible in blocks, each of which contains two or more length codes which are addressed by sets of coordinates which directly succeed one another in said series, and in which the determination of the sum involves determination of sub-sum of two or more lengths on the basis of reading one block.

9. The method as claimed in claim 8, in which all sets of coordinates within each category are identical for a predetermined part.

10. The method as claimed in claim 1, in which the space and the associated sets of coordinates are at least three-dimensional.

11. The method as claimed in claim 1, in which the length code indicating a length zero is chosen if the data item has one of several standard values, the length code in that case also indicating the relevant standard value of the data item.

12. A device comprising a memory system which is arranged to store data items, each data item having an associated set of coordinates in a space, and also comprising write means and read means which are coupled to the memory system, the write means comprising an input for receiving a data item associated with a relevant set of coordinates, length determining means which are arranged to determine from the data item a length code which indicates a data length required for storage of the data item in the data item memory, a length memory, length write means for writing the length code in the length memory, writing in the length memory taking place at an address corresponding to the relevant set of coordinates, data item write means for writing the data item in the data item memory at an own address which corresponds to a cumulation of the length codes of all associated sets of coordinates preceding the relevant associated set of coordinates in a predetermined series of sets of coordinates, and in which the read means comprise:

an input for receiving a presented set of coordinates with which a searched data item is associated, length read means for reading a searched length code from the length memory, addressed by the presented set of coordinates, and data item read means for reading the searched data item from the data item memory, comprising:

sum determining means for determining a sum of lengths indicated by length codes of the associated sets of coordinates preceding the presented set of coordinates in the series, and indexing means arranged to read the searched data item indexed with the sum from the data item memory.

13. The device as claimed in claim 12, in which the memory system comprises classification means for classifying the associated set of coordinates with which the data item is associated within a predetermined classification of the sets of coordinates, the classification subdividing the space into categories of sets of coordinates, the sets of coordinates in each category constituting a respective concatenation in said series;

a reference memory, reference write means for writing respective references in the reference memory, each reference relating to a respective sub-set of the data item stored in the data item memory and associated memory and associated with sets of coordinates in the relevant category, reference read means for reading a reference from the reference memory, addressed by an indication of the category of the presented set of coordinates, the indexing means being arranged to read the data item, indexed with a combination of the sum and the reference, from the data item memory.

14. A device as claimed in claim 12, in which the length memory is accessible in blocks, each of which contains two or more length codes which are addressed by way of sets of coordinates which succeed one another in said series, and in which the sum determining means are arranged to sum two or more lengths for the determination of the sum on the basis of reading one block.

15. The device as claimed in claim 12, in which all sets of coordinates within each category are identical for a predetermined part.

16. The device as claimed in claim 12, in which the space and the associated sets of coordinates are at least three-dimensional.

* * * * *